(12) United States Patent
Spangler (10) Patent No.: US 9,988,934 B2
(45) Date of Patent: Jun. 5, 2018

(54) GAS TURBINE ENGINES INCLUDING CHANNEL-COOLED HOOKS FOR RETAINING A PART RELATIVE TO AN ENGINE CASING STRUCTURE

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 304 days.

(21) Appl. No.: 14/807,703

(22) Filed: Jul. 23, 2015

(65) Prior Publication Data

US 2017/0022842 A1 Jan. 26, 2017

(51) Int. Cl.
| | | |
|---|---|---|
| *F01D 25/12* | (2006.01) | |
| *F01D 9/04* | (2006.01) | |
| *F01D 25/24* | (2006.01) | |
| *F01D 25/14* | (2006.01) | |

(52) U.S. Cl.
CPC ............. *F01D 25/12* (2013.01); *F01D 9/042* (2013.01); *F01D 25/14* (2013.01); *F01D 25/246* (2013.01); *F05D 2260/22141* (2013.01)

(58) Field of Classification Search
CPC ......... F05D 2260/22141; F01D 25/246; F01D 9/042; F01D 25/14; F01D 25/12
See application file for complete search history.

(56) References Cited

U.S. PATENT DOCUMENTS

| | | | |
|---|---|---|---|
| 7,972,107 B2 | 7/2011 | Dervaux et al. | |
| 2004/0018081 A1* | 1/2004 | Anderson, Jr. | ......... F01D 25/14 415/108 |
| 2012/0189426 A1* | 7/2012 | Thibodeau | ............. F01D 11/08 415/1 |
| 2012/0257954 A1* | 10/2012 | Chanteloup | ............. F01D 5/187 415/1 |

FOREIGN PATENT DOCUMENTS

| | | |
|---|---|---|
| DE | 102013212501 | 12/2014 |
| EP | 1384858 | 1/2004 |
| EP | 2863020 | 4/2015 |
| GB | 2378730 | 2/2003 |

OTHER PUBLICATIONS

Phil Ligrani, Heat Transfer Augmentation Technologies for Internal Cooling of Turbine Components of Gas Turbine Engines, Sep. 24, 2012, International Journal of Rotating Machinery, vol. 2013.*
Extended European Search Report dated Nov. 25, 2016 in European Application No. 16170696.5.

* cited by examiner

*Primary Examiner* — Dwayne J White
*Assistant Examiner* — Justin A Pruitt
(74) *Attorney, Agent, or Firm* — Snell & Wilmer, L.L.P.

(57) ABSTRACT

A gas turbine engine is provided. The gas turbine engine includes an engine casing structure and a part retained relative to the engine casing structure by a channel-cooled hook. The channel-cooled hook includes at least a portion of a hook cooling channel. A vane assembly for the gas turbine engine is also provided.

20 Claims, 6 Drawing Sheets

GAS TURBINE ENGINES INCLUDING CHANNEL-COOLED HOOKS FOR RETAINING A PART RELATIVE TO AN ENGINE CASING STRUCTURE

GOVERNMENT LICENSE RIGHTS

This invention was made with government support under FA-8650-09-D-2923-0021 awarded by the United States Air Force. The government has certain rights in the disclosure.

FIELD

The present disclosure relates to gas turbine engines, and more specifically, to gas turbine engines including channel-cooled hooks for retaining a part relative to an engine casing structure.

BACKGROUND

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads. One or more sections of the gas turbine engine may include a plurality of vane assemblies having vanes interspersed between rotor assemblies that carry the blades of successive stages of the section. The rotor assemblies may be disposed radially inward of an annular blade outer air seal (BOAS).

SUMMARY

A gas turbine engine is provided in accordance with various embodiments. The gas turbine engine includes an engine casing structure and a part retained relative to the engine casing structure by a channel-cooled hook. The channel-cooled hook includes at least a portion of a hook cooling channel.

A gas turbine engine is provided in accordance with various embodiments. The gas turbine engine comprises an engine casing structure including a case hook and a part having a hook and retained relative to the engine casing structure by the hook mating with the case hook. At least one of the hook and the case hook include at least a portion of a hook cooling channel defining a channel-cooled hook.

A vane assembly is provided for a gas turbine engine in accordance with various embodiments. The vane assembly comprises a vane having a vane hook of a pair of vane hooks configured to be received by a case hook of an engine casing structure. At least one of the vane hook and the case hook including at least a portion of a hook cooling channel to define a channel-cooled hook. A dam extends from and between the pair of vane hooks to prevent the flow of a cooling fluid between the pair of vane hooks and directs the cooling fluid into and through the hook cooling channel.

In any of the foregoing embodiments, the part comprises a vane retained relative to the engine casing structure by the channel-cooled hook comprising a vane hook. The dam comprises at least one of a non-segmented rail or a feather seal extending between the pair of hooks. The part comprises a blade outer air seal (BOAS) retained to the engine casing structure by the channel-cooled hook comprising a BOAS hook. The channel-cooled hook comprises a segmented, L-shaped hook. The hook cooling channel includes heat transfer enhancement features including at least one of rib turbulators, pin fins, or pedestals. The hook cooling channel comprises a bore extending through the channel-cooled hook. The portion of the hook cooling channel cooperates with a coverplate mounted over the portion to define the hook cooling channel.

BRIEF DESCRIPTION OF THE DRAWINGS

The present invention will hereinafter be described in conjunction with the following drawing figures, wherein like numerals denote like elements, and wherein.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step.

Various embodiments are directed to gas turbine engines including channel-cooled hooks for retaining a part relative to an engine casing structure. As used herein, the term "channel-cooled hooks" may refer to hooks for retaining a part relative to the engine casing structure and that include at least a portion of a hook cooling channel according to various embodiments. Without a hook cooling channel included in the hooks, hook temperatures may exceed hook material temperature capability, thereby lowering hook strength and hook retention capabilities. Even if temperature capabilities are not exceeded, lower hook temperatures are able to be maintained, resulting in lower stresses, permitting thinner hooks and saving overall weight. Additionally, gas turbine engine structures surrounding the channel-cooled hooks may benefit from lower temperatures enabled by the channel-cooled hooks.

As used herein, a "part" that may be retained relative to an engine casing structure with one or more channel-cooled hooks includes a blade outer air seal (BOAS), a vane, a combustor, and the like. The channel-cooled hooks may be BOAS hooks, vane hooks, case hooks, and other hooks (all collectively referred to as "hooks" or a "hook", unless specified otherwise) used for retaining a part relative to the engine casing structure.

Figure 1:
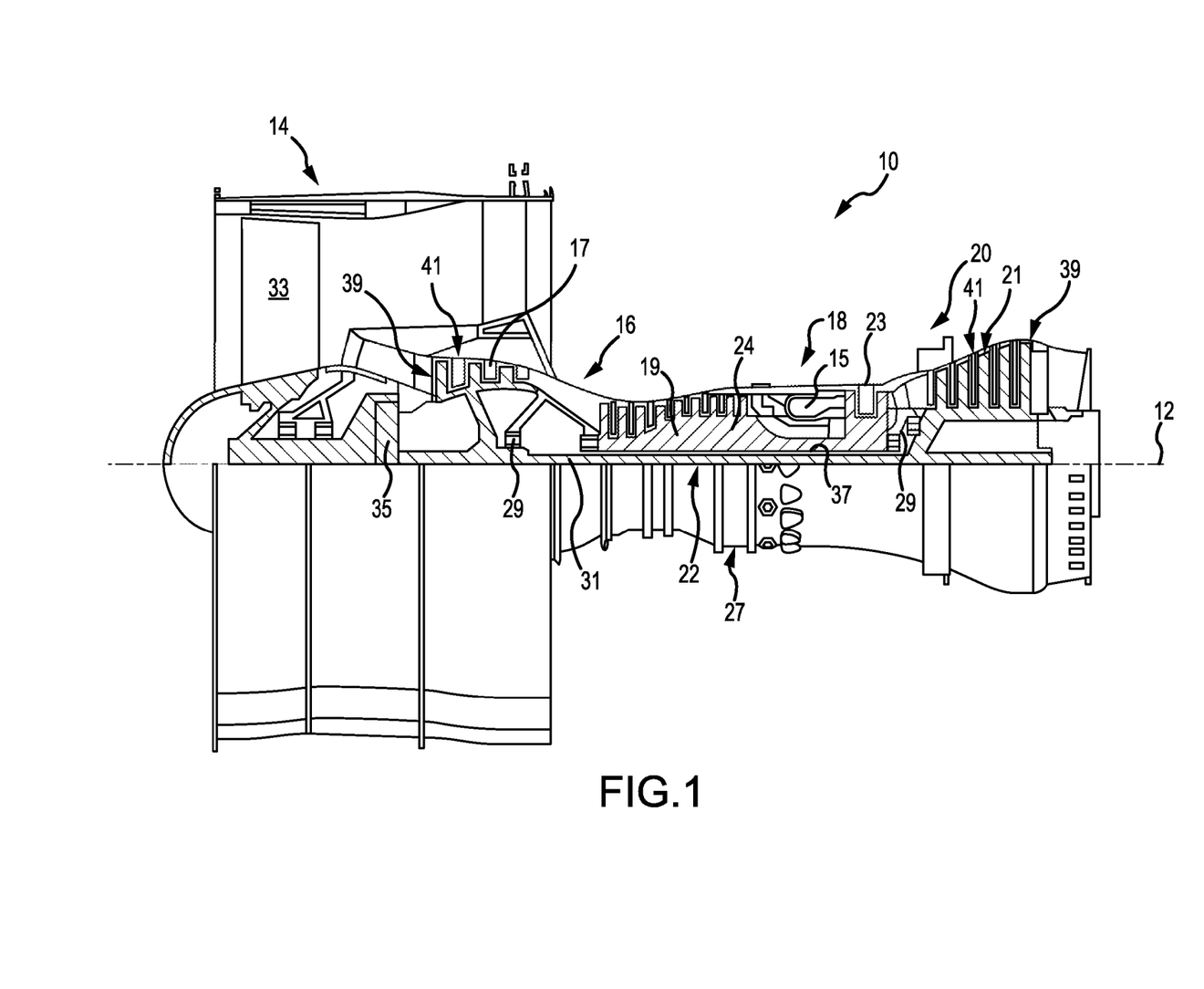
FIG. 1 illustrates a conventional gas turbine engine.

FIG. 1 schematically illustrates a conventional gas turbine engine 10. The exemplary gas turbine engine 10 is a two spool turbofan engine that generally incorporates a fan section 14, a compressor section 16, a combustor section 18 and a turbine section 20. Alternative engines might include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20. This view is highly schematic and is included to provide a basic understanding of the gas turbine engine 10 and not to limit the disclosure. This disclosure extends to all types of gas turbine engines and to all types of applications, including but not limited to, three spool turbofan configurations. The gas turbine engine 10 generally includes at least a low speed spool 22 and a high speed spool 24 mounted for rotation about an engine centerline axis 12 relative to an engine case 27 via several bearing systems 29. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be disposed at any location of the gas turbine engine, including but not limited to, adjacent the low pressure turbine 21. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

Figure 2:
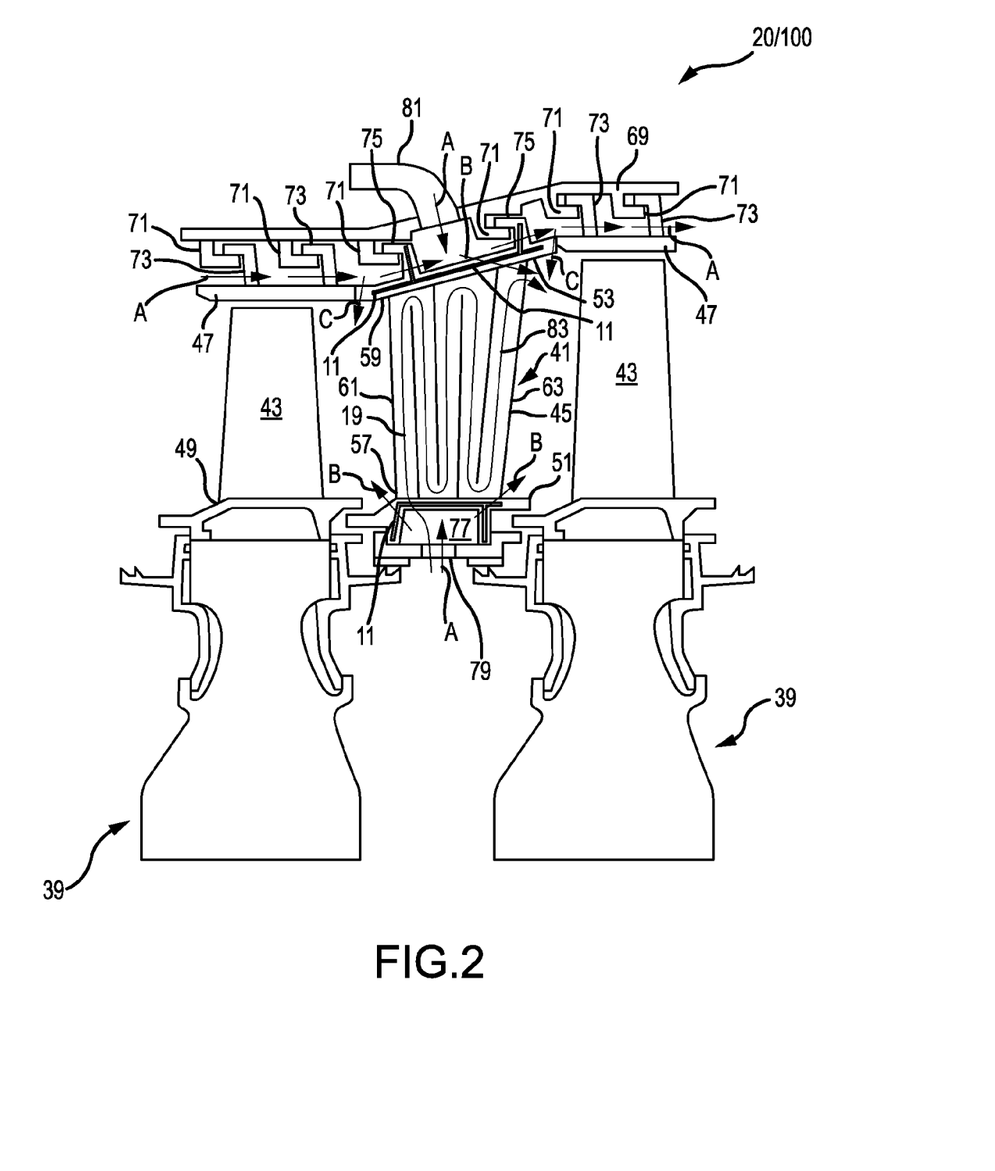
FIG. 2 illustrates a conventional flow scheme through a portion of a turbine section of the conventional gas turbine engine of FIG. 1.

The compressor section 16 and the turbine section 20 can each include alternating rows of rotor assemblies 39 and vane assemblies 41. The rotor assemblies 39 carry a plurality of rotating blades 43, while each vane assembly 41 includes a plurality of vanes 45 (FIG. 2). The rotating blades 43 of the rotor assemblies 39 create or extract energy (in the form of pressure) from the airflow that is communicated through the gas turbine engine 10. The vanes 45 of the vane assemblies 41 direct airflow to the blades of the rotor assemblies 39 to either add or extract energy. Each vane of the vane assemblies 41 is circumferentially retained to the engine as hereinafter described.

Figure 3:
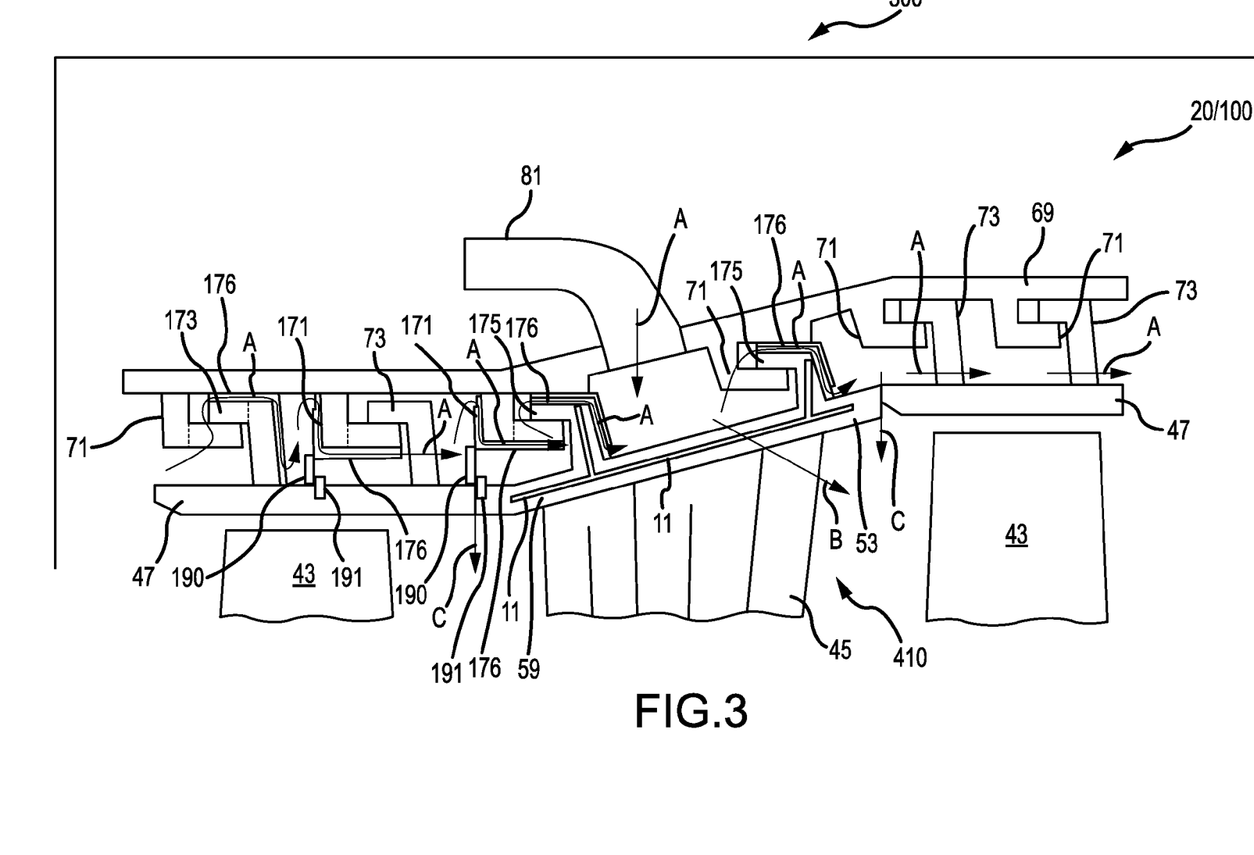
FIG. 3 is similar to FIG. 2, illustrating a flow scheme through a portion of the turbine section of a gas turbine engine according to various embodiments.

FIG. 2 illustrates a turbine portion 100 of the gas turbine engine 10. FIG. 3 illustrates a turbine portion 100 of a gas turbine engine 500 according to various embodiments. The turbine portion 100 of gas turbine engine 500 includes a vane assembly 410 according to various embodiments as hereinafter described. This disclosure is not limited to the turbine section 20, and could extend to other sections of the gas turbine engine 10, including but not limited to the compressor section 16. As noted previously, the turbine section 20 can include alternating rows of rotor assemblies 39 and vane assemblies 41. The rotor assemblies 39 may be disposed radially inward of an annular blade outer air seal (BOAS) 47. The BOAS 47 is disposed at an outer diameter of a tip of the blade(s) 43 and provides an outer diameter flow path for the core airflow. A vane inner platform 51 provides an inner diameter flow path for the core airflow.

Figure 4:
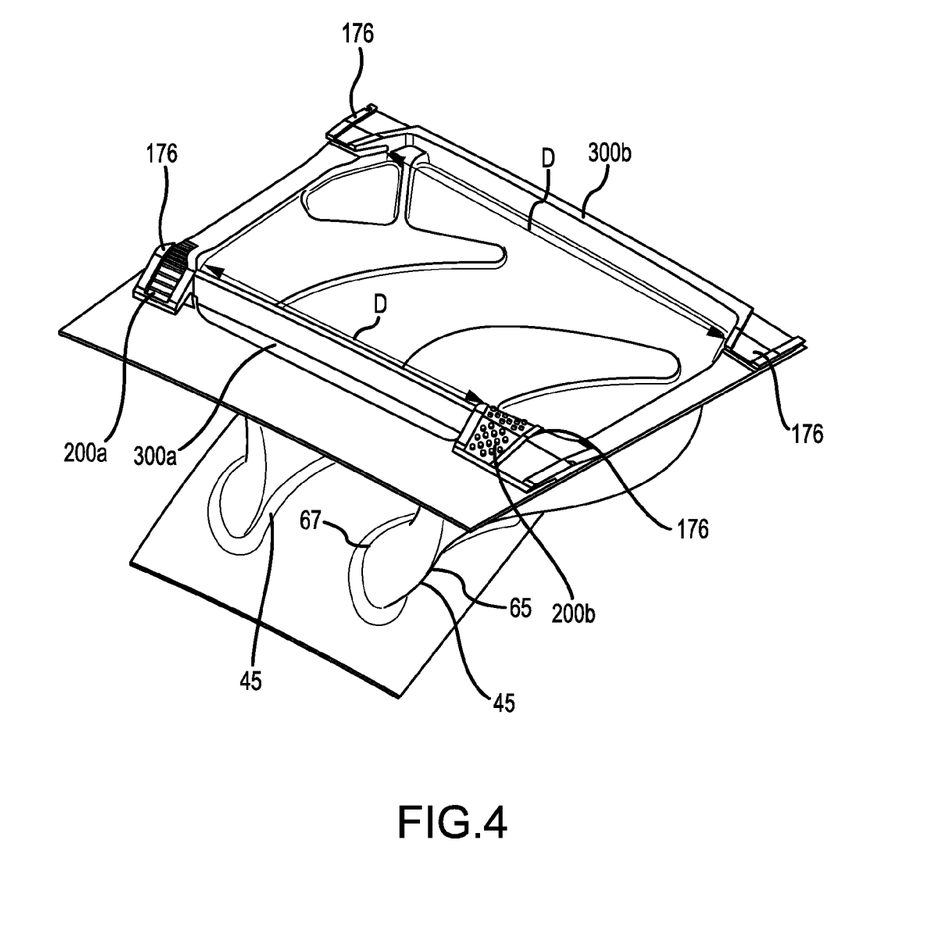
FIG. 4 is an isometric view of a vane segment, illustrating hook cooling channels of the vane hooks containing various heat transfer enhancement features.

Each vane assembly 41 includes the plurality of vanes 45 that are circumferentially disposed (into and out the page of FIG. 2) about the engine centerline axis 12 (FIG. 1). Each vane 45 includes an airfoil 49 that extends between a vane inner platform 51 and a vane outer platform 53. Hot combustion gas flows between vane inner platform 51 and the vane outer platform 53. The vanes 45 may be configured to provide a single airfoil or may be arranged in vane segments (e.g., FIG. 5) of multiple airfoils. The vane 45 may be a stationary vane or a variable vane and could be cantilevered. The vane 45 includes the airfoil 49, an inner end 57 at an inner diameter, and an outer end 59 at the outer diameter. The airfoil 49 comprises a leading edge 61, a trailing edge 63, a pressure side 65 and a suction side 67 (FIG. 4).

The vane assembly 41 is connected to an engine casing structure 69 associated with the portion 100 of the gas turbine engine 10. The engine casing structure 69 includes at least one case hook 71, for purposes as hereinafter described. The case hook 71 may be segmented (i.e., does not span a full circumference). The BOAS 47 and the vane assemblies 41 may be disposed radially inward of the engine casing structure 69. One or both of the BOAS 47 and vane assemblies 41 may be segmented and include a feather seal 11 between segments to help prevent leakage of cooling fluid between the segments as hereinafter described.

Still referring to FIGS. 2 and 3, the BOAS 47 and the vanes 45 of the turbine section 20 are retained to the engine casing structure 69 by BOAS hooks 73 of the BOAS and vane hooks 75, respectively. The vane hooks 75 are used to achieve radial and axial attachment of the vane relative to the engine casing structure 69. The BOAS hooks 73 and vane hooks 75 are mated with and received by the case hooks 71 of the engine casing structure 69. A plurality of BOAS hooks 73 and vane hooks 75 respectively retain the BOAS 47 and the vanes 45 to the engine casing structure 69 for proper functioning during gas turbine engine operation.

As hereinafter described, in accordance with various embodiments, and with specific reference to FIG. 3, at least one of the case hook, the BOAS hook, or the vane hook may comprise a channel-cooled hook each including at least a portion of a hook cooling channel. A case hook including at least a portion of a hook cooling channel is referred to in FIG. 3 with reference numeral 171. A BOAS hook including at least a portion of a hook cooling channel is referred to in FIG. 3 with reference numeral 173 while the vane hook including at least a portion of a hook cooling channel is referred to in FIG. 3 with reference numeral 175. The hook cooling channel in the case hook, the BOAS hook, and the vane hook is referred to in FIG. 3 with reference numeral 176.

The conventional flow scheme through the turbine section is depicted in FIG. 2. Cooling fluid indicated by arrows A, such as bleed air, is introduced into an inner diameter vane cavity 77 through an orifice 79 and may also be introduced to the vane through a turbine cooling fluid (TCA) pipe 81 at the outer diameter of the vane. The turbine cooling fluid (TCA) pipe 81 at the outer diameter of the vane introduces cooling fluid (arrows A) to the vane. The cooling fluid also mixes with cooling fluid from an upstream source. Cooling fluid may be provided to the vane and the airfoil 49 through a serpentine cooling circuit 83 (FIG. 2). Cooling fluid flows aft across the BOAS 47 and past a first set of BOAS hooks 73. The cooling fluid continues on past a leading edge/forward vane hook 75, mixes with the cooling fluid introduced by the TCA pipe 81, and continues traveling aft past the trailing edge/aft vane hook 75, then flowing across the aft BOAS 47 and past the second set of BOAS hooks 73. As the cooling fluid flows aft, a portion of the cooling fluid leaks out (becoming leakage fluid) across the feather seal 11 between vane segments as depicted in FIG. 2 by arrows B, and between the BOAS and an adjacent vane as depicted in FIG. 2 by arrows C.

FIG. 3, in accordance with various embodiments, illustrates a flow scheme through the turbine section of the gas turbine engine 500 according to various embodiments. The vane assembly 410 according to various embodiments comprises a vane having a vane hook configured to be received by a case hook of an engine casing structure, at least one of the vane hook and the case hook including a hook cooling channel defining a channel-cooled hook and a dam extending from and between a pair of the hooks (more particularly, vane hooks in the depicted embodiment) to prevent the flow of a cooling fluid between hooks and directing the cooling fluid into and through the hook cooling channel as hereinafter described.

As noted previously, case hooks 171, BOAS hooks 173, and vane hooks 175 are depicted as including at least a portion of a hook cooling channel 176 each forming a channel-cooled hook. It is to be understood that fewer than all the hooks may include at least a portion of the hook cooling channel and that channel-cooled hooks may be in a sequence other than that depicted in FIG. 3. In various embodiments, the channel-cooled hooks may be segmented (i.e., does not span a full circumference), having a generally L-shape. The segmented hooks do not span across the entire circumference of the part (i.e., in and out the page of FIG. 3).

Still referring to FIG. 3, according to various embodiments, the flow scheme through the gas turbine engine according to various embodiments is described below and is similar to the conventional flow scheme previously described, with the exceptions as noted below. During engine operation, cooling fluid, such as bleed air, is introduced into an inner diameter vane cavity through an orifice and may also be introduced to the vane through a turbine cooling fluid (TCA) pipe 81 at the outer diameter of the vane. The turbine cooling fluid (TCA) pipe at the outer diameter of the vane introduces cooling fluid to the vane. The cooling fluid also mixes with cooling fluid from an upstream source. Cooling fluid may be provided to the vane and the airfoil itself through a serpentine cooling circuit. Cooling fluid flows aft across the BOAS, into the hook cooling channel 176 (if present) of the BOAS hooks 173, and past a first set of BOAS hooks. The cooling fluid continues on past a leading edge/forward vane hook, mixes with the cooling fluid introduced by the TCA pipe, and continues traveling aft past the trailing edge/aft hook flowing across the BOAS and past the second set of BOAS hooks. The cooling fluid may also flow through a hook cooling channel 176 (if present) in a case hook 171. A seal 190 positioned as shown in FIG. 3 may be used to prevent aft flow through the seal and direct the cooling fluid toward the hook cooling channel. The seal 190 may be a retaining ring seal, a dogbone seal, or other full hoop seal or the like. The seal 190 may rest against an axial stop 191 in a surrounding component (a BOAS 47 and/or vane 45) to prevent the seal 190 from moving aft.

As noted previously, a portion of the cooling fluid may leak across the first feather seal between vane segments (arrows B) and between the BOAS and an adjacent vane (arrows C). The cooling fluid is directed to and through the hook cooling channels of the channel-cooled hooks by the dam as hereinafter described in accordance with various embodiments, resulting in higher heat transfer of the hooks relative to hooks without hook cooling channels. The hook cooling channels have a much smaller flowpath area than the gap D between the circumferentially adjacent hooks (FIGS. 4 and 5), thereby improving heat transfer of the hooks.

The hook cooling channel may be formed in the hook by a number of manufacturing methods. For example, in various embodiments, the hook cooling channel comprises a bore extending through the hook, the hook cooling channel comprising the bore integrally formed in the vane hook by casting (using, for example, a ceramic core or refractory metal core to form the hook cooling channel therein), machining, additive manufacturing such as direct metal laser sintering (DMLS), or the like. The bore comprises a tubular enclosed passage. In various embodiments, the channel-cooled hook comprises a hook on which a coverplate 90 (FIGS. 5 and 6) may be mounted over the portion of the hook, thereby defining the hook cooling channel 176 disposed between the portion of the hook and the coverplate. The portion of the hook over which the coverplate is mounted or otherwise disposed has an open side that is covered by the coverplate. The coverplate 90 may be comprised of sheet metal that may be welded over the hook. The cover plate may alternatively be cast or otherwise integrally manufactured with the rest of the vane. The hook cooling channel 176 may be formed in the vane hook, BOAS hook, the case hook, etc. using the same methods.

Referring now to FIG. 4, according to various embodiments, the interior surface of the hook cooling channel may be substantially smooth or may include heat transfer enhancement features such as rib turbulators (also known as "trip strips") 200*a*, pedestals or pin fins 200*b*, or the like. Substantially smooth hook cooling channels have the least amount of pressure drop, but also tend to have a lower heat transfer coefficient. The heat transfer enhancement features turbulate the flow increasing the heat transfer coefficient, but also causing a pressure drop. If there is no pressure drop (i.e., no pressure difference in the cooling fluid between the leading edge of the hook and the trailing edge of the hook), the cooling fluid may not flow through the hook. Therefore, the presence, type, and/or absence of heat transfer enhancement features is a balance between the pressure drop between the leading and trailing edges of the hooks and the desired heat transfer coefficient.

Figure 5:
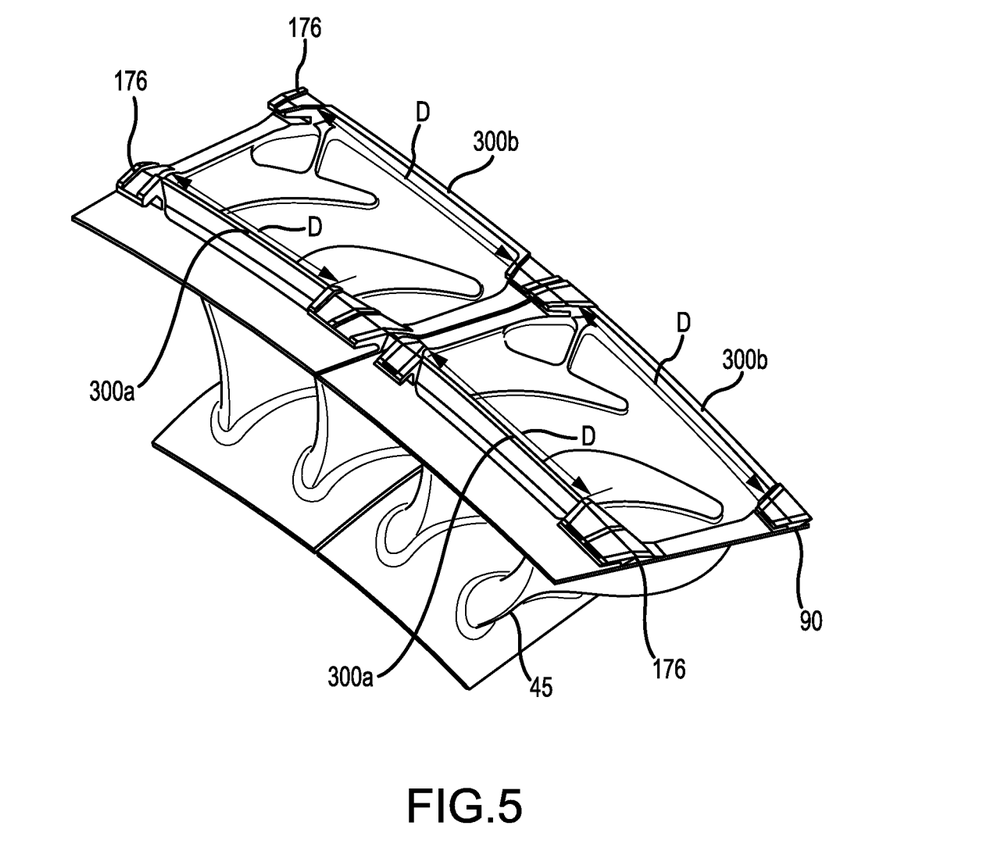
FIG. 5 illustrates a pair of the vane segments of FIG. 4 with a first feather seal between the vane segments and a dam comprising a first non-segmented rail and a second non-segmented rail from and between, respectively, the vane hooks at the leading edge and the vane hooks at the trailing edge.

Referring again to FIGS. 5 and 6, according to various embodiments as noted previously, the gas turbine engine may further comprise the dam to seal the open gap D between circumferentially adjacent hooks (vane hooks in the depicted embodiment). The dam stops the flow between adjacent hooks and directs flow toward the hook cooling channels. In various embodiments, as depicted in FIG. 5, the dam comprises a first non-segmented rail 300a and a second non-segmented rail 300b. The first non-segmented rail spans from and between circumferentially adjacent vane hooks along the leading edge of the outer platform and the second non-segmented 300b rail spans between circumferentially adjacent vane hooks along the trailing edge of the outer platform. The first and second non-segmented rails 300a and 300b may be cast with the vanes having the vane hooks. In accordance with various embodiments, the first non-segmented rail may be integral (one-piece) with the circumferentially adjacent vane hooks at the leading edge of the outer platform and the second non-segmented rail may be integral (one-piece) with the circumferentially adjacent vane hooks at the trailing edge forming, respectively, a non-segmented leading edge vane hook and a non-segmented trailing edge vane hook. As used herein, the term "non-segmented" refers to spanning a full circumference. In order for the cooling fluid to get past the non-segmented rails and into an aft cavity, the cooling fluid is directed toward and through the hook cooling channels 176 as depicted in FIG. 3.

Figure 6:
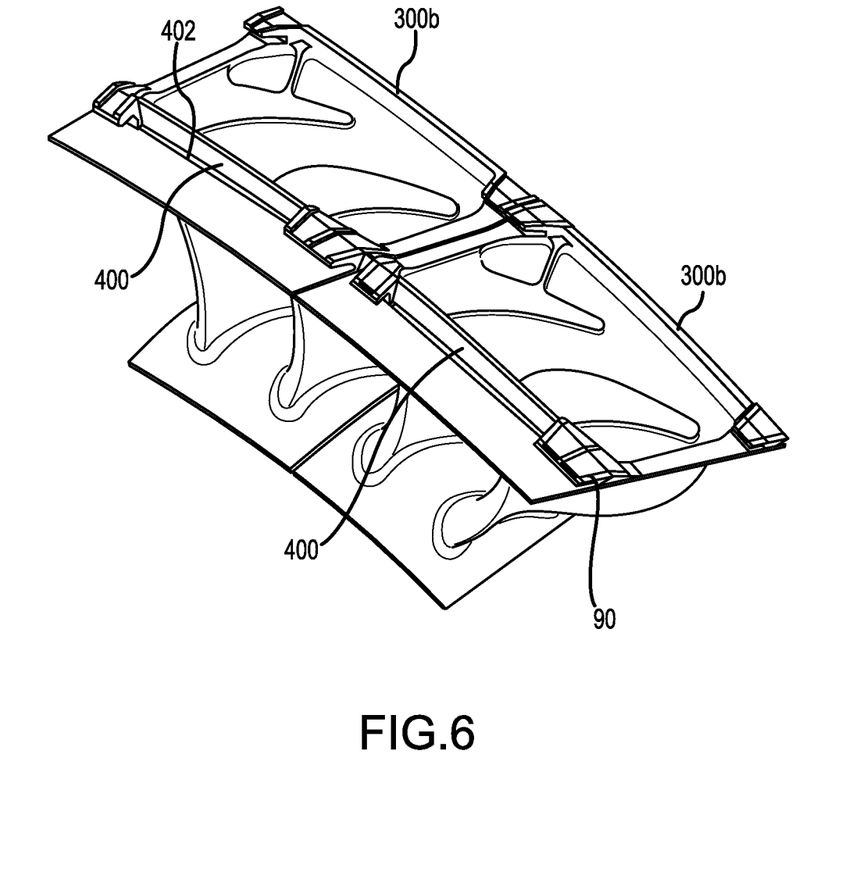
FIG. 6 illustrates a pair of vane segments with a feather seal between the vane segments and a dam comprising feather seals from and between, respectively, the vane hooks at the leading edge and the vane hooks at the trailing edge and a hook cooling channel formed by a coverplate overlying the vane hook.

Referring now specifically to FIG. 6, in accordance with various embodiments, the dam may comprise a second feather seal 400 disposed between circumferentially adjacent hooks. The second feather seal 400 may extend in feather seal slots 402 in the outer platform and in opposing sides of the circumferentially adjacent vane hooks. The second feather seal 400 may be welded to the outer platform and/or the circumferentially adjacent vane hooks to prevent the feather seal from becoming dislodged. The second feather seal may alternatively or additionally be retained in place by an overlying coverplate (if used to form the hook cooling channel). It is to be understood that a combination of the rail and second feather seal may be used as the dam. Moreover, it is to be understood that a dam as described herein may be used between a pair of BOAS hooks and/or case hooks in the same manner as between a pair of vane hooks.

Various embodiments as described in the present disclosure enable the channel-cooled hooks to move larger amounts of heat per unit time, thereby maintaining hook strength and hook retention capabilities. Lower temperatures are able to be maintained during operation, resulting in lower stresses, permitting thinner hooks and saving overall weight. Additionally, structures surrounding the channel-cooled hooks benefit from the lower temperatures enabled by the channel-cooled hooks.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
an engine casing structure;
a part retained relative to the engine casing structure by a channel-cooled hook, wherein the channel-cooled hook includes at least a portion of a hook cooling channel, wherein the portion of the hook cooling channel extends axially through the channel-cooled hook, and wherein the part comprises:
a pair of hooks defining a gap therebetween, the pair of hooks including the channel-cooled hook, and
a dam extending from the pair of hooks to a radially inward surface of the engine casing structure to seal the gap between the pair of hooks; and
a seal disposed radially inward of the channel-cooled hook and configured to direct an aftward airflow radially outward toward the hook cooling channel, wherein the seal comprises a hoop seal, and wherein the seal rests against an axial stop configured to prevent the seal from moving aft.

2. The gas turbine engine of claim 1, wherein the part comprises a vane retained relative to the engine casing structure by the channel-cooled hook comprising a vane hook.

3. The gas turbine engine of claim 1, wherein the dam comprises at least one of a non-segmented rail or a feather seal.

4. The gas turbine engine of claim 1, wherein the part comprises a blade outer air seal (BOAS) retained to the engine casing structure by the channel-cooled hook comprising a BOAS hook.

5. The gas turbine engine of claim 1, wherein the channel-cooled hook comprises a case hook of the engine casing structure.

6. The gas turbine engine of claim 1, wherein the channel-cooled hook comprises a segmented, L-shaped hook.

7. The gas turbine engine of claim 1, wherein the hook cooling channel includes heat transfer enhancement features including at least one of rib turbulators, pin fins, or pedestals.

8. The gas turbine engine of claim 1, wherein the hook cooling channel comprises a bore extending through the channel-cooled hook.

9. The gas turbine engine of claim 1, wherein the portion of the hook cooling channel cooperates with a coverplate mounted over the portion to define the hook cooling channel.

10. A gas turbine engine comprising:
an engine casing structure including a case hook; and
a part having a first hook, wherein the part is retained relative to the engine casing structure by the first hook mating with the case hook, wherein at least one of the first hook of the part or the case hook defines at least a portion of a hook cooling channel, wherein the portion of the hook cooling channel extends axially through the at least one of the first hook or the case hook; and
a seal disposed radially inward of the first hook and configured to direct an aftward airflow toward the first hook and the hook cooling channel, wherein the seal rests against an axial stop configured to prevent the seal from moving aft.

11. The gas turbine engine of claim 10 wherein the part comprises a pair of hooks defining a gap therebetween, the pair of hooks including the first hook, the gas turbine engine further comprising a dam for sealing the gap, the dam comprising a non-segmented rail extending from and between the pair of the hooks.

12. The gas turbine engine of claim 10, wherein the part is a BOAS and the first hook is a BOAS hook.

13. The gas turbine engine of claim 10, wherein the part is a vane and the first hook is a vane hook.

14. The gas turbine engine of claim 10, wherein the first hook comprises a segmented, L-shaped hook.

15. A vane assembly for a gas turbine engine, the vane assembly comprising:
a vane having a pair of vane hooks configured to be received by a case hook of an engine casing structure, wherein at least one vane hook of the pair of vane hooks defines at least a portion of a hook cooling channel extending axially through the at least one vane hook of the pair of vane hooks;
a dam extending between the pair of vane hooks, wherein the dam spans a gap between the pair of vane hooks and extends to a radially outward surface of the pair of vane hooks to prevent a flow of a cooling fluid between the pair of vane hooks and direct the cooling fluid into and through the hook cooling channel;
a seal located forward and radially inward of the pair of vane hooks and configured to direct an aftward airflow toward the pair of vane hooks and the hook cooling channel, the seal comprising at least one of a ring seal, a dogbone seal, or a hoop seal.

16. The vane assembly of claim 15, wherein the pair of vane hooks comprise segmented, L-shaped hooks.

17. The vane assembly of claim 15, wherein the hook cooling channel includes heat transfer enhancement features including at least one of rib turbulators, pin fins, or pedestals.

18. The vane assembly of claim 15, wherein the hook cooling channel comprises a bore extending through the at least one vane hook of the pair of vane hooks.

19. The vane assembly of claim 15, wherein the portion of the hook cooling channel cooperates with a coverplate mounted over the portion to define the hook cooling channel.

20. The vane assembly of claim 15, wherein the case hook comprises a pair of case hooks and the dam comprises a first dam and a second dam, the first dam extending between the pair of vane hooks and the second dam extending between the pair of case hooks to prevent the flow of the cooling fluid between the pair of case hooks and direct the cooling fluid into and through the hook cooling channel.

\* \* \* \* \*